United States Patent
Qi et al.

(10) Patent No.: US 11,705,979 B2
(45) Date of Patent: Jul. 18, 2023

(54) JOINT DETECTION FOR PRIMARY SYNCHRONIZATION SIGNAL (PSS) AND OTHER SYNCHRONIZATION SIGNAL SYMBOLS IN TARGET CELL SEARCH

(71) Applicant: Apple Inc., Cupertino, CA (US)

(72) Inventors: Yihong Qi, Santa Clara, CA (US); Herbert R. Dawid, Herzogenrath (DE); Pouyan Parvazi, Dresden (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/448,836

(22) Filed: Sep. 24, 2021

(65) Prior Publication Data

US 2023/0093947 A1   Mar. 30, 2023

(51) Int. Cl.
  *H04J 11/00*   (2006.01)

(52) U.S. Cl.
  CPC ....... *H04J 11/0073* (2013.01); *H04J 11/0076* (2013.01); *H04J 11/0079* (2013.01)

(58) Field of Classification Search
  CPC . H04J 11/0073; H04J 11/0076; H04J 11/0079
  See application file for complete search history.

(56) References Cited

U.S. PATENT DOCUMENTS

| | | | |
|---|---|---|---|
| 2011/0255394 A1 | 10/2011 | Zha et al. | |
| 2013/0279419 A1* | 10/2013 | Li | H04W 24/02 370/328 |
| 2013/0288696 A1* | 10/2013 | Nanri | H04W 72/082 455/452.1 |
| 2014/0293954 A1* | 10/2014 | Horvat | H04W 48/16 370/330 |
| 2019/0191441 A1* | 6/2019 | Kusashima | H04L 25/0202 |
| 2020/0252890 A1* | 8/2020 | Irukulapati | H04W 72/005 |
| 2022/0191675 A1* | 6/2022 | Mukherjee | H04W 8/005 |

FOREIGN PATENT DOCUMENTS

| | | |
|---|---|---|
| EP | 2315380 A1 | 4/2011 |
| WO | 2021068006 A2 | 4/2021 |

* cited by examiner

*Primary Examiner* — Hashim S Bhatti
(74) *Attorney, Agent, or Firm* — Sterne, Kessler, Goldstein & Fox P.L.L.C.

(57) ABSTRACT

Aspects are described for a user equipment (UE) comprising a transceiver configured to enable wireless communication with a serving cell and a processor communicatively coupled to the transceiver. The processor is configured to determine a reference signal sequence that comprises a primary synchronization signal (PSS) sequence and a secondary synchronization signal (SSS) sequence of a target cell. The processor is further configured to receive a signal sequence from the target cell and calculate an overall correlation value based on the reference signal sequence and the received signal sequence. The processor is further configured to determine that the overall correlation value is above a threshold and detect a synchronization signal block (SSB) of the target cell based on the received signal sequence. Finally, the processor is configured to establish a wireless connection with the target cell based on the SSB.

20 Claims, 7 Drawing Sheets

JOINT DETECTION FOR PRIMARY SYNCHRONIZATION SIGNAL (PSS) AND OTHER SYNCHRONIZATION SIGNAL SYMBOLS IN TARGET CELL SEARCH

BACKGROUND

Field

The described aspects generally relate to a target cell search in a wireless communication system.

SUMMARY

Some aspects of this disclosure relate a user equipment (UE) comprising a transceiver and a processor communicatively coupled to the transceiver. The processor is configured to determine a reference signal sequence that comprises a first level synchronization sequence and a second level synchronization sequence of a target cell. The processor is further configured to receive a signal sequence from the target cell and calculate an overall correlation value based on the reference signal sequence and the received signal sequence. The processor is further configured to determine whether the overall correlation value exceeds a threshold and based on the overall correlation value exceeding the threshold, detect a synchronization signal of the target cell based on the received signal sequence. Finally, the processor is configured to establish a wireless connection with the target cell based on the synchronization signal.

Some aspects of this disclosure relate to a method of operating a UE connecting to a target cell. The method comprises determining a reference signal sequence that comprises a first level synchronization sequence and a second level synchronization sequence of the target cell. The method further comprises receiving a signal sequence from the target cell and calculating an overall correlation value based on the reference signal sequence and the received signal sequence. The method further comprises determining whether the overall correlation value exceeds a threshold and based on the overall correlation value exceeding the threshold, detecting a synchronization signal of the target cell based on the received signal sequence. Finally, the method comprises establishing a connection with the target cell based on the synchronization signal.

Some aspects of this disclosure relate to a non-transitory computer-readable medium (CRM) comprising instructions to, upon execution of the instructions by one or more processors of a UE, cause the UE to perform operations. The operations comprise determining a reference signal sequence that comprises a first level synchronization sequence and a second level synchronization sequence of a target cell. The operations further comprise receiving a signal sequence from the target cell and calculating an overall correlation value based on the reference signal sequence and the received signal sequence. The operations further comprise determining whether the overall correlation value exceeds a threshold and based on the overall correlation value exceeding the threshold, detecting a synchronization signal of the target cell based on the received signal sequence. Finally, the operations comprise establishing a connection with the target cell based on the synchronization signal.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings.

In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing a target cell search using a joint detection for 3rd Generation Partnership Project (3GPP) release 15 (Rel-15), release 16 (Rel-16), release 17 (Rel-17), and/or other 3GPP releases. For example, systems and methods are provided for implementing the joint detection that is based on a primary synchronization signal (PSS) and other synchronization signal symbols, such as synchronization signal block (SSB) symbols.

According to some aspects, a user equipment (UE) operates according to Release 15 (Rel-15), Release 16 (Rel-16), and/or Release 17 (Rel-17) and/or New Radio (NR) of $5^{th}$ generation (5G) wireless technology for digital cellular networks as defined by 3GPP, and the UE can support cell searches. For example, the UE performs a cell search to establish a wireless connection with a cell. The cell search can be an initial cell search or a target cell search. In some aspects, the UE does not connect with any cells. For example, the UE is powered-on or has previously lost connection. The UE performs the initial cell search to connect with a cell, such as a serving cell. The UE detects, a synchronization signal, such as an SSB, transmitted by the serving cell to establish the connection with the serving cell. In some aspects, the SSB comprises a primary synchronization signals (PSS), a secondary synchronization signal (SSS), and physical broadcast channel (PBCH) signals, wherein the PBCH signals include PBCH demodulation reference signals (PBCH DMRSs) and PBCH payloads. The UE determines a time location of the synchronization signal, such as the SSB, based on a first level synchronization sequences, such as PSS reference sequences, that are included in the synchronization signal. In some aspects, the UE determines a correlation value between the PSS reference sequences and received signals. If the correlation value is higher than a predetermined threshold, the UE determines that the received signals correspond to the synchronization signal and connects with the serving cell based on the synchronization signal. For example, the UE performs a time synchronization and a frequency synchronization with the serving cell using the PSS. The UE also relies on the SSS to detect a physical cell ID (PCID) of the serving cell. Thereafter, the UE determines the PBCH DMRSs and decodes the PBCH payloads, which can be used by the UE to receive and decode other information, such as a master information block (MIB) of the serving cell, to establish the connection with the serving cell.

In some aspects, the UE may perform a target cell search. The UE connects with the serving cell and identifies an additional neighboring cell to connect with, such as a target cell. For example, the UE is at a cell boundary and requires a hand-over to connect with the target cell. The UE may also connect with the target cell as a secondary cell in a dual connection mode. In both cases, the UE determines a time location of a synchronization signal, such as an SSB, of the target cell based on a first level synchronization sequence, such as a PSS reference sequence, a second level synchronization sequence, such as an SSS reference sequence, and additional information, such as PBCH DMRS sequences or cell-specific reference sequences (CRS) of the target cell. For example, the UE determines a correlation value between the received signals and a combination of the PSS reference sequence, the SSS reference sequence, and the PBCH DMRS sequence. If the correlation value is higher than the predetermined threshold, the UE determines that the received signals correspond to the SSB of the target cell and connects with the target cell based on the received signals. Therefore, in the target cell search, the UE has more information of the neighboring cell, which makes the neighboring cell a target cell. In some aspects, the serving cell transmits a configuration message to the UE. The configuration message indicates the PSS reference sequence, the SSS reference sequence, and the PBCH DMRS sequence. In other aspects, the UE determines a correlation value between the received signals and a combination of the PSS reference sequence, the SSS reference sequence, and the CRS sequence. If the correlation value is higher than the predetermined threshold, the UE determines that the received signals correspond to the synchronization signals of the target cell and connects with the target cell based on the received signals. In some aspects, the second level synchronization sequence and the additional information are not available during the initial cell search.

Figure 1:
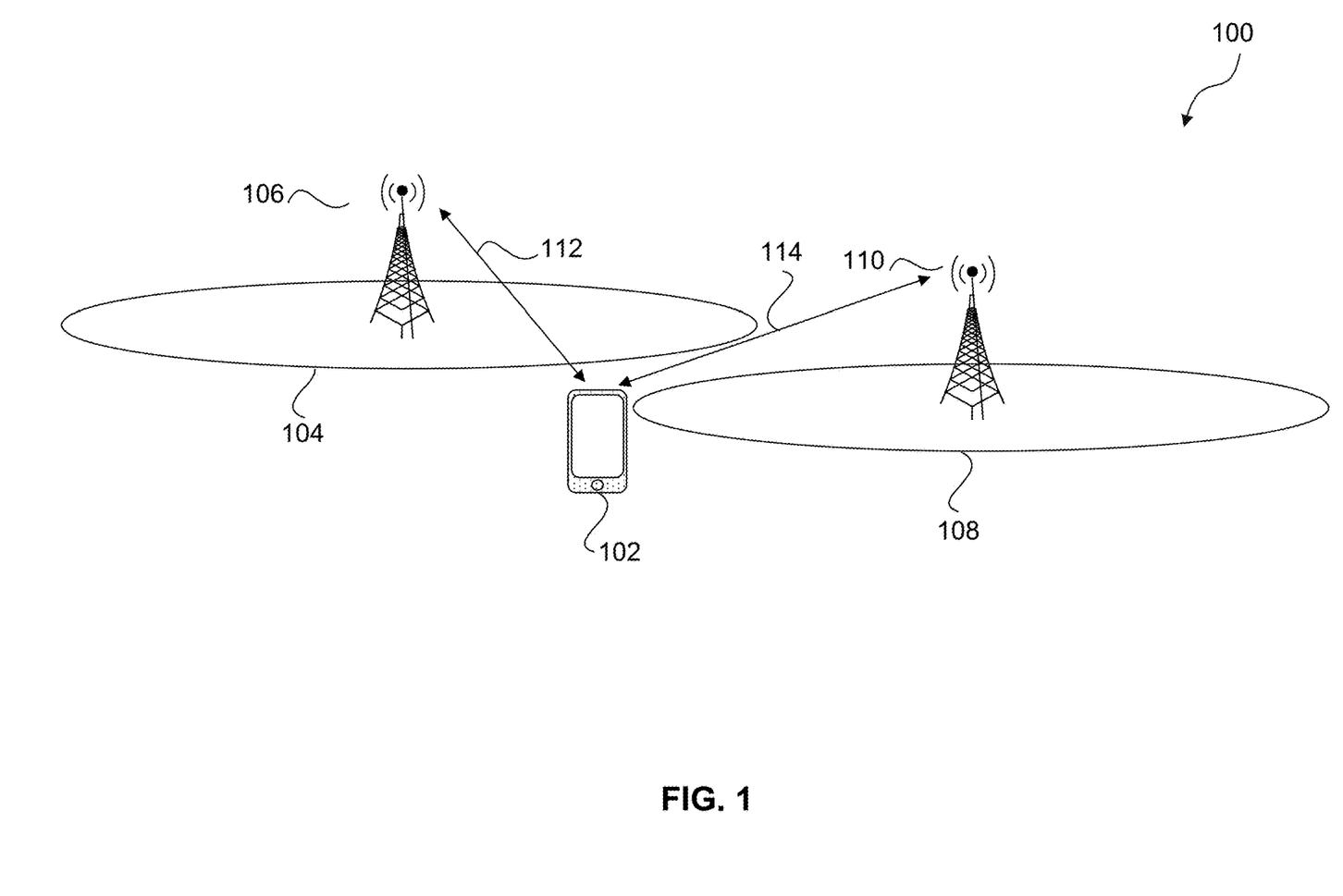
FIG. 1 illustrates an example system implementing a target cell search using a joint detection, according to some aspects of the disclosure.

FIG. 1 illustrates an example system 100 implementing designs of the target cell search using the joint detection, according to some aspects of the disclosure. Example system 100 is provided for the purpose of illustration only and does not limit the disclosed aspects. System 100 may include, but is not limited to, a UE 102, a base station 106, a base station 110, a cell 104, and a cell 108. The UE 102 and the base stations 106 and 110 may be implemented as electronic devices configured to operate based on a wide variety of wireless communication techniques. These techniques may include, but are not limited to, techniques based on 3rd Generation Partnership Project (3GPP) standards. For example, the UE 102 may include electronic devices configured to operate using one or more 3GPP releases, such as Release 15 (Rel-15), Release 16 (Rel-16), Release 17 (Rel-17), or other 3GPP releases. The UE 102 may include, but is not limited to, wireless communication devices, smartphones, laptops, desktops, tablets, personal assistants, monitors, televisions, wearable devices, Internet of Things (IoT) devices, vehicle communication devices, and the like. The base stations 106 and 110 may include one or more nodes configured to operate based on a wide variety of wireless communication techniques such as, but not limited to, techniques based on the 3GPP standards.

In some aspects, the base station 106 supports the cell 104. The UE 102 establishes a connection with the cell 104 via the base station 106, such as a connection 112. The cell 104 may be a serving cell of the UE 102 and the attempt of the UE 102 to connect with the serving cell is also referred to as an initial cell search. For example, the UE 102 establishes the connection with the cell 104 based on an SSB signal of the cell 104 received from the base station 106. In some aspects, the UE 102 searches a time location of the SSB signal based on first level synchronization sequences, such as one or more PSS reference sequences. For example, the UE 102 calculates one or more correlation values between each of the one or more PSS reference sequences and a first symbol of the signals received from the base station 106. The UE 102 may determine that a correlation value of the one or more correlation values is higher than a threshold. In such a case, the UE 102 determines that the SSB signal begins with the first symbol of the received signals and therefore determines the time location of the SSB signal. In some aspects, the first level synchronization sequences are available to the UE 102 during the initial cell search, For example, the UE 102 determines and stores the first level synchronization sequences, such as the one or more PSS reference sequences, based on a standard, such as a 3GPP standard. In other aspects, the UE 102 receives the first level synchronization sequences, such as the one or more PSS reference sequences, from a base station that the UE 102 previously connects to.

In some aspects, the UE 102 may determine that the one or more correlation values between the one or more PSS reference sequences and the first symbol of the signals received from the base station 106 are all lower than the threshold. The UE 102 then determines that the received signal does not match the SSB signal. In such a case, the UE 102 receives additional signals and calculates one or more correlation values based on the additional signals received similarly as described above. In some aspects, the UE 102 searches the SSB signal within a searching window. When UE 102 performs the initial cell search, a size of the searching window can be predetermined, such as 20 ms, for example.

In some aspects, the base station 110 supports the cell 108. The UE 102 can establish a connection with the cell 108 via the base station 110, such as a connection 114. In some aspects, the UE 102 connects with the cell 108 during a handover process. For example, the UE 102 is on a boundary between the cell 104 and the cell 108. The UE 102 may also move away from the cell 104 and move towards the cell 108. Therefore, signal strengths received by the UE in the cell 104 fall below a predetermined threshold and the UE 102 is required to establish a new connection with a new base station, such as the connection 114 with the base station 110. In other aspects, the UE 102 connects with the cell 108 in a dual-connection mode. In other words, the UE 102 connects with the cell 108 via the connection 114 and maintains the connection 112 with the cell 104. In both cases, the cell 108 is a target cell and the attempt of the UE 102 to connect with the target cell is also referred to as a target cell search. In the target cell search, UE 102 is provided with more information. For example, in addition to a first level synchronization sequence, such as a PSS reference sequence, the UE 102 also has a second level synchronization sequence, such as an SSS reference sequence, and additional information, such as PBCH-DMRS sequence information or CRS of the cell 108. For example, the base station of the serving cell, such as the base station 106, transmits a configuration message to the UE 102, wherein the configuration message includes information indicating the first level synchronization sequence, the second level synchronization sequence, and the additional information of the cell 108. In some aspects, the serving cell, such as the base station 106, transmits the configuration message via a radio resource control (RRC) transmission.

In some aspects, the UE 102 determines a time location of an SSB signal of the cell 108 based on the PSS reference sequence, the SSS reference sequence, and a PBCH-DMRS sequence. The UE 102 can determine the PBCH-DMRS sequence based on the PBCH-DMRS sequence information. In some aspects, the PBCH-DMRS sequence information includes an SSB index of the cell 108. The UE 102 can calculate the PBCH-DMRS sequence based on the SSB index. In some aspects, the UE 102 can determine the SSB index of the cell 108 based on an SSB index of the cell 104. In other words, the UE 102 can determine the PBCH-DMRS sequence based on the SSB index of the cell 104. Once the UE 102 obtains the PSS reference sequence, the SSS reference sequence, and the PBCH-DMRS sequence of the cell 108, the UE 102 calculates a correlation value between the signals received from the base station 110 and a combination of the PSS reference sequence, the SSS reference sequence, and the PBCH-DMRS sequence. If the correlation value is above a threshold, the UE 102 determines that a first symbol of the signals received from the base station 110 corresponds to the SSB signal of the cell 108 and therefore determines the time location of the SSB signal.

In some aspects, the UE 102 may determine that the correlation value is lower than the threshold. The UE 102 then determines that the received signal does not correspond to the SSB signal of the cell 108. In such a case, the UE 102 receives additional signals from the base station 110 and calculates an additional correlation value based on the additional signals received similarly as described above. In some aspects, the UE 102 searches the SSB signal within a searching window. When UE 102 performs the target cell search, a size of the searching window can be predetermined, such as, e.g. 5 ms.

In some aspects, a detection rate of the SSB signal corresponds to a length of a combined reference sequence. For example, as described above, the target cell search uses the combination of the PSS reference sequence, the SSS reference sequence, and the PBCH-DMRS sequence of the cell 108 and the initial target cell search uses the PSS reference sequences of the cell 104. Because the target cell search uses a longer reference sequence, it has a higher detection rate compared with the initial cell search. In some aspects, the UE 102 can perform the target cell search using a combination of the PSS reference sequence and the SSS reference sequence, without the PBCH-DMRS sequence. In such a case, the detection rate would be lower than the case where the UE 102 performs the target cell search use the combination of the PSS reference sequence, the SSS reference sequence, and the PBCH-DMRS sequence.

Figure 2:
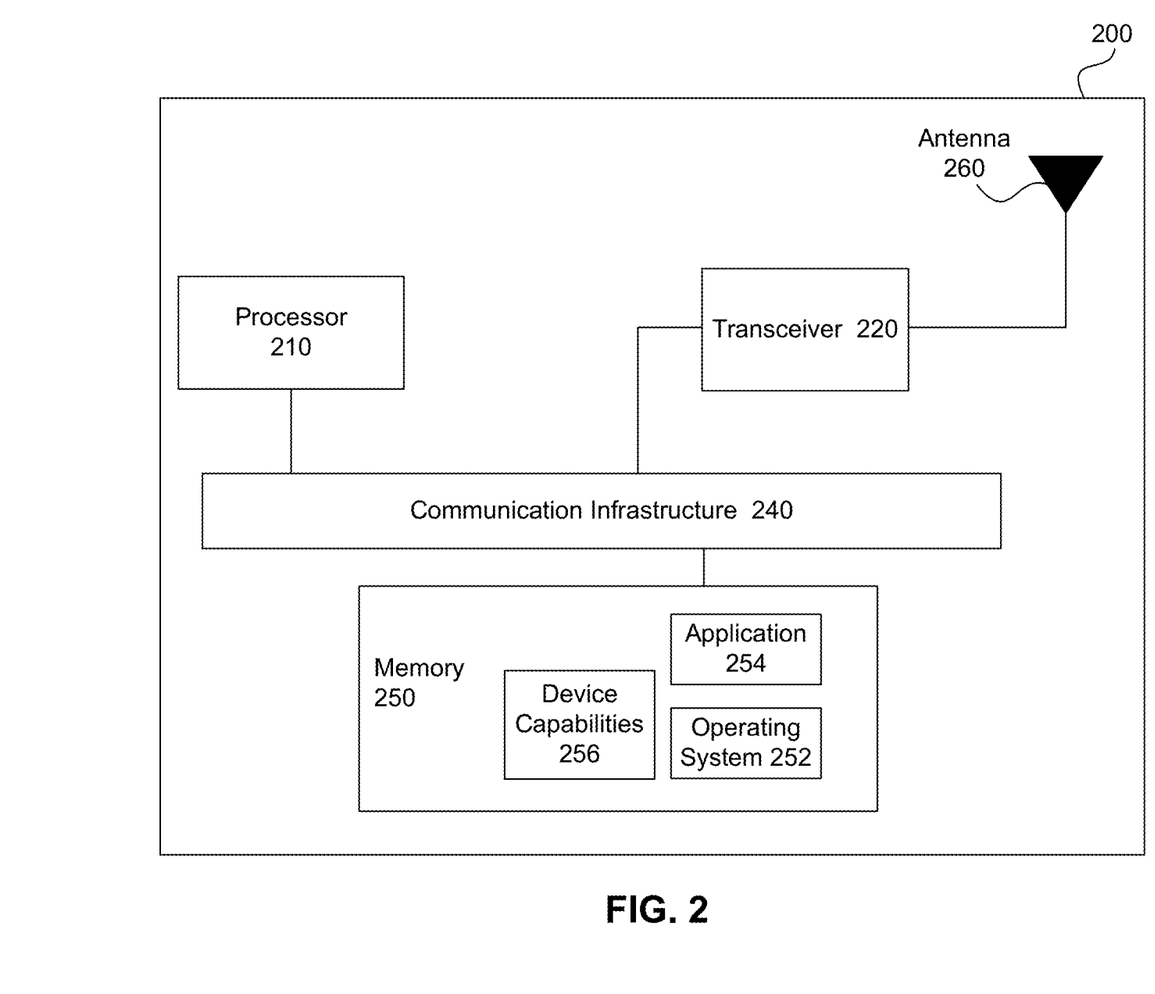
FIG. 2 illustrates a block diagram of an example system of an electronic device for the target cell search, according to some aspects of the disclosure.

FIG. 2 illustrates a block diagram of an example system 200 of an electronic device implementing the joint detection, according to some aspects of the disclosure. The system 200 may be any of the electronic devices (e.g., the UE 102) of the system 100. The system 200 includes a processor 210, one or more transceivers 220, a communication infrastructure 240, a memory 250, an operating system 252, an application 254, device capabilities 256, and one or more antennas 260. Illustrated systems are provided as exemplary parts of system 200, and system 200 may include other circuit(s) and subsystem(s). Also, although the systems of system 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200 and/or a user of wireless system 200. The applications in the application 254 may include applications such as, but not limited to, Siri™, FaceTime™, radio streaming, video streaming, remote control, and/or other user applications. In some aspects, the device capabilities 256 may be stored in the memory 250. For example, the device capabilities 256 include computational complexity capabilities, processing speed, and other capabilities.

The system 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling system 200 of the system 100 to implement joint cell detection, as described herein. Alternatively, or additionally, the processor 210 can be "hard coded" to implement mechanisms for the joint cell detection for a target cell search, as described herein The one or more transceivers 220 transmit and receive communications signals support mechanisms for the joint cell detection for a target cell search. Additionally, the one or more transceivers 220 transmit and receive communications signals that support mechanisms for measuring communication link(s), generating and transmitting system information, and receiving the system information. According to some aspects, the one or more transceivers 220 may be coupled to antenna 260 to wirelessly transmit and receive the communication signals. Antenna 260 may include one or more antennas that may be the same or different types. The one or more transceivers 220 allow system 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

As discussed in more detail below with respect to FIGS. 3-7, processor 210 may implement different mechanisms for the joint detection as discussed with respect to the system 100 of FIG. 1.

Figure 3:
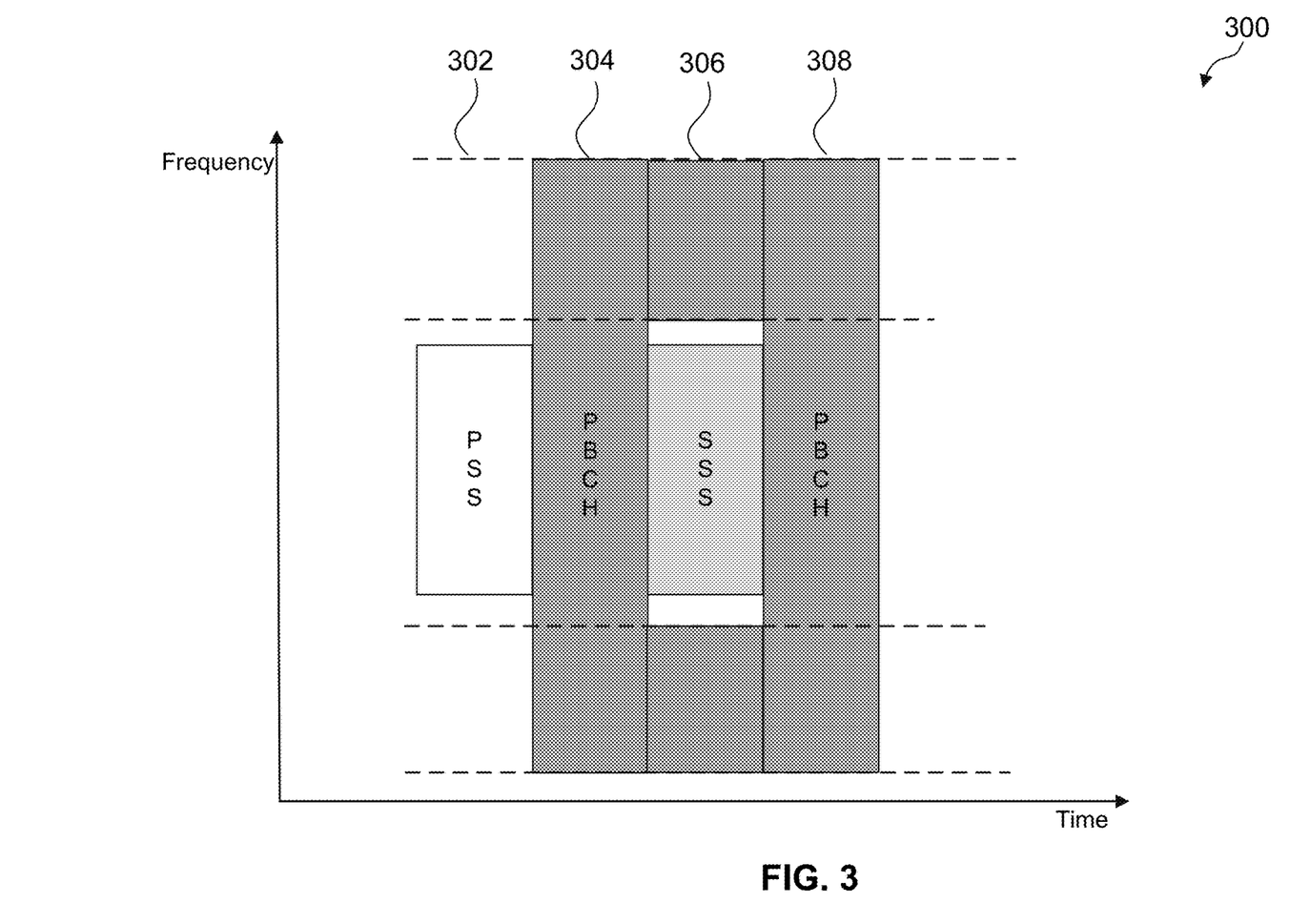
FIG. 3 illustrates an example synchronization signal block (SSB) signal, according to aspects of the disclosure.

FIG. 3 illustrates an example SSB signal 300. As a convenience and not a limitation, FIG. 3 may be described with regard to elements of FIGS. 1, 2, and 7. For example, a base station, such as the base station 106 and 110 of FIG. 1, the system 200 of FIG. 2, or computer system 700 of FIG. 7, can transmit the SSB signal 300 shown in FIG. 3. An UE, such as the UE 102 of FIG. 1, the system 200 of FIG. 2, or computer system 700 of FIG. 7, can receive the SSB signal shown in the FIG. 3.

In some aspects, the SSB signal 300 includes four symbols, such as symbols 302, 304, 306, and 308. The symbols 302, 304, 306, and 308 can be orthogonal frequency-division multiplexing (OFDM) symbols. In some aspects, a first symbol of the SSB signal, such as the symbol 302, includes information corresponding to a PSS reference sequence. For example, the UE 102 can decode the symbol 302 and convert the symbol 302 to a PSS reference sequence. A second, a third, and a fourth symbol, such as symbols 304, 306, and 308, include information corresponding to a PBCH sequence, which comprises a PBCH payload and a PBCH-DMRS sequence. The UE 102 can decode and convert the symbols 304, 306, and a part of the symbol 308 to obtain a PBCH sequence. The third symbol, such as symbol 306, also includes information corresponding to an SSS reference sequence. The UE 102 can decode and convert the symbol 306 to the SSS reference sequence. The UE 102 can distinguish a PBCH portion and an SSS portion of the symbol 306 by the frequencies. For example, the SSS portion of the symbol 306 occupies 127 subcarriers around a center frequency. The PBCH portion of the symbol 306 includes a top part and a bottom part relative to the center frequency, where each can occupy 48 subcarriers. In some aspects, the first symbol, such as symbol 302 occupies 127 subcarriers. The second and the fourth symbol, such as symbols 304 and 308 occupies 240 subcarriers.

In some aspects, a base station, such as the base stations 106 and 110, transmits SSB signals to the UE 102 in a synchronization signal (SS) burst set. The SS burst set includes one or more SSB signals. In some aspects, a maximum number of the SSB signals $L_{MAX}$ in one SS burst set depends on a subcarrier spacing (SCS). For example, if the SCS is 15 kHz or 30 kHz, $L_{MAX}$=4 or 8. If the SCS is 120 kHz or 240 kHz, $L_{MAX}$=64. In some aspects, the SCS depends on a carrier frequency. For example, if the carrier frequency is below 6 GHz, the SCS is 15 kHz or 30 kHz. If the carrier frequency is above 6 GHz, the SCS is 120 kHz or 240 kHz. In some aspects, the SS burst set is within a predetermined time period, such as 5 ms. The predetermined time period can be the searching window of the target cell search discussed above and below. In other words, the UE 102 searches for the SSB signal within the predetermined time period in the target cell search.

In some aspects, the base station, such as the base stations 106 and 110, transmits the SS burst set periodically. For example, the base station transmits the SS burst set every 20 ms in an initial access, when the UE 102 establishes connection 112 with the base station 106. The base station 106 can also configure the periodicity of the SS burst set to be other values, such as 5 ms, 10 ms, 40 ms, 80 ms, and 160 ms, once the connection 112 is established between the UE 102 and the base station 106.

In some aspects, the symbol 302 corresponds to one of three PSS reference sequences, which represent three group IDs. In some aspects, the UE 102 determines and stores the three PSS reference sequences based on a standard, such as a 3GPP standard. In other aspects, the UE 102 receives the three PSS reference sequences from a base station that the UE 102 previously connects to. In the initial search, the UE 102 determines the time location of the SSB signal transmitted by the base station 106 based on the three possible PSS reference sequences, which are previously stored by the UE in a memory, such as the memory 256. For example, the UE 102 receives signals from the base station 106, wherein the received signals include one or more symbols. The UE 102 converts a first symbol of the received signals to an in-phase/quadrature (I/Q) sample sequence. The UE 102 then calculates correlation values, such as cross-correlation values, between the I/Q sample sequence and each of the three possible PSS reference sequences. If the first symbol of the received signals is a first symbol of an SSB signal, such as the symbol 302, the I/Q sample sequence will correspond to one of the three possible PSS reference sequences. In such a case, at least one correlation value would be higher than a threshold. The UE 102 then determines that the first symbol of the received signals is the first symbol of the SSB signal, such as the symbol 302. Because the other three symbols of the SSB signal, such as symbols 304, 306, and 308 follow the symbol 302 as shown in FIG. 3, the UE 102 can determine that three symbols following the first symbol of the received signals are the second, the third, and the four symbols of the SSB signal. In such a case, the UE 102 obtains the SSB signal and can establish a connection with the base station 106 using the SSB signal.

However, the first symbol of the received signals may not be the first symbol of the SSB signal. In such a case, the UE 102 determines that the correlation values are all below the threshold. The UE 102 then continues searching for the SSB signal. In some aspects, the UE 102 delays the first symbol by one I/Q sample and checks if the delayed first symbol of the received signals is the first symbol of the SSB signal in a similar way as described above for the first symbol. For example, the UE 102 removes a first I/Q sample of the first symbol and concatenate an I/Q sample that follows the first symbol to form the delayed first symbol of the received signals. Because the UE 102 continues to receive symbols from the base station 106, the UE 102 checks each received symbol until the SSB is located. In some aspects, the UE 102 searches the SSB signal within a searching window with a size of 20 ms.

In some aspects, in the target cell search, where the UE 102 attempts to connect with the cell 108 via the base station 110, the UE 102 has more information. For example, in the initial cell search, the UE 102 knows the three possible PSS reference sequences. In the target cell search, the UE 102 knows a particular PSS reference sequence that the symbol 302 corresponds to. Therefore, in the target cell search, the UE 102 check the symbols received from the target cell, such as the cell 108, by calculating a correlation value between the received symbol and the particular PSS reference sequence. In some aspects, the base station of the serving cell, such as the base station 106, provides information corresponding to the particular PSS reference sequence of the cell 108 to the UE 102 via a configuration message. For example, the configuration message can include a cell ID of the target cell, such as the cell 108. The UE 102 can derive the particular PSS reference sequence from the cell ID of the target cell using modulo operation, such as mod(cell_ID, 3). In one aspect, the particular PSS reference sequence is an M-sequence with a length of 127. The particular PSS reference sequence can also be generated using binary phase shift keying (BPSK).

In some aspects, the UE 102 can also derive an SSS reference sequence of the cell 108 based on the cell ID of the target cell, which is received from the base station 106 via the configuration message. For example, the UE 102 can derive the SSS reference sequence of the cell 108 as described in a related technical standard document, such as section 7.4.2.3 of TS 38.211 developed by 3GPP. In one aspect, similar to the PSS reference sequence, the SSS reference sequence is also an M-sequence with a length of 127 and can be generated using BPSK. The UE 102 can search the SSB signal using both the PSS and the SSS reference sequences. For example, the UE 102 receives signals, which include one or more symbols, from the base station 108. The UE 102 checks if a first symbol and a third symbol of the received signals correspond to the symbols 302 and 306 of the SSB signal. The UE 102 converts the first and the third symbol of the received signals to a combine sequence. For example, the UE 102 converts the first symbol and the second symbol to a first and a second I/Q sample sequences respectively. The UE 102 then concatenates the first and the second I/Q sample sequences to form the combined sequence. The UE 102 also concatenates the PSS and the SSS reference sequences to form a combined reference sequence. Finally, the UE 102 calculates an overall correlation value between the combined sequence and the combined reference sequence. If the overall correlation value is above a threshold, the UE 102 determines that the first and the third symbols of the received signals correspond to the symbol 302 and the symbol 306 of the SSB signal.

Based on this, the UE 102 also determines that a second symbol and a fourth symbol of the received signal corresponding to the symbols 304 and 308 of the SSB signal. Therefore, the UE 102 locates the SSB signal and can establish connection 114 with the cell 108 via the base station 110 using the SSB signal as described above.

In some aspects, the UE 102 calculates correlation value without combining the first and the third symbol of the received signal. For example, the UE 102 can calculate a first correlation value between the first symbol of the received signals and the PSS reference sequence and calculate a second correlation value between the third symbol of the received signals and the SSS reference sequence. In some aspects, the UE 102 delays the received signal by a predetermined symbol duration and calculates the second correlation value between the delayed received signals and the SSS reference sequence. In some aspects, the predetermined symbol duration is a two-symbol duration, as defined in the NR of 5G wireless standard. In other aspects, the predetermined symbol duration can be other durations, such as a one-symbol duration. The predetermined symbol duration can also be a negative value. For example, the SSS reference sequence can locate in a symbol before the PSS sequence. In such a case, instead of delaying the received signals, the UE 102 checks one or more symbols prior to the received signals in time, such as a symbol that is received before the received signals. For example, the predetermined symbol duration can be one negative symbol duration. The UE checks a symbol prior to the received signals and calculates the second correlation value between the symbol prior to the received signals and the SSS reference sequence. In some aspects, the UE 102 stores symbols received prior to the received signals. The UE 102 then combines the first and the second correlation values coherently or non-coherently. For example, the UE 102 combines non-coherently by adding absolute values of the first and the second correlation values. In another example, the UE 102 combines coherently by adding the first and the second correlation values directly, wherein the first and the second correlation values can be complex or real numbers.

In some aspects, the UE 102 may determine that the overall correlation value is below the threshold. In such as case, the UE 102 can continue to search the received signal in a moving window style. For example, the UE 102 delays the first symbol of the received signal by one I/Q sample to obtain the second symbol of the received signal, as described above. Therefore the second symbol of the received signals moves up to be in a position of the first symbol and all other symbols following the first symbol are delayed by one I/Q sample in the same way. In other words, the received signals are delayed by one I/Q sample duration. The UE 102 then repeats the process described above based on the delayed received signals to search for the SSB signal. In some aspects, the UE 102 searches the SSB signal within a search window. For example, the UE 102 performs the moving window style searching described above within the search window. In some aspects, the search window is periodic. For example, the search window can be a 5 ms period that repeats every 20 ms.

In some aspects, the configuration message received by the UE 102 from the base station 106 may also include PBCH-DMRS sequence information corresponding to the PBCH-DMRS sequence. In one aspect, the PBCH-DMRS sequence information includes an SSB index of the cell 108. The UE 102 can determine the PBCH-DMRS sequence of the cell 108 based on the SSB index and the cell ID of the cell 108, wherein the cell ID of the cell 108 can be derived from the configuration message by the UE 102 as described above. The UE 102 can also determine the SSB index of the cell 108 based on an SSB index of the cell 104 because the cell 104 and the cell 108 are neighboring cells. The SSB index of the cell 104 can be included in the configuration message or delivered to the UE 102 by the base station 106 via other transmissions. In some aspects, the PBCH-DMRS sequence is a pseudo-random sequence with a length of 144. The PBCH-DMRS sequence can be generated using quadrature phase shift keying (QPSK).

In some aspects, the UE 102 can search the SSB signal using the PSS reference sequence, the SSS reference sequences, and the PBCH-DMRS sequence. For example, the UE 102 can calculate the first and the second I/Q sample sequences in a similar way as described above. The UE 102 can also calculate a third I/Q sample sequence corresponding to the PBCH-DMRS sequence based on the second, the third, and the fourth symbols of the received signals. This is because if the first four symbols of the received signals correspond to the SSB signal, the UE 102 can extract the PBCH-DMRS sequence based on the second, the third, and the fourth symbols of the received signals. In other words, the UE 102 treats the first four symbols of the received signals as the SSB signal and attempt to extract the PBCH-DMRS sequence. After obtaining the first, the second, and the third I/Q sample sequences, the UE 102 calculates an overall correlation value in similar ways as described above. For example, the UE 102 can combine the first, the second, and the third I/Q sample sequences and then calculates the overall correlation value. The UE 102 can also calculate a first, a second, and a third correlation values based on the first, the second, and the third I/Q sample sequences and then combine the first, the second, and the third correlation values. More details are described in FIGS. 4-6.

In some aspects, the UE 102 may determine that the overall correlation value is below the threshold. In such as case, the UE 102 continues to search the received signal in a moving window style as described above.

Figure 4:
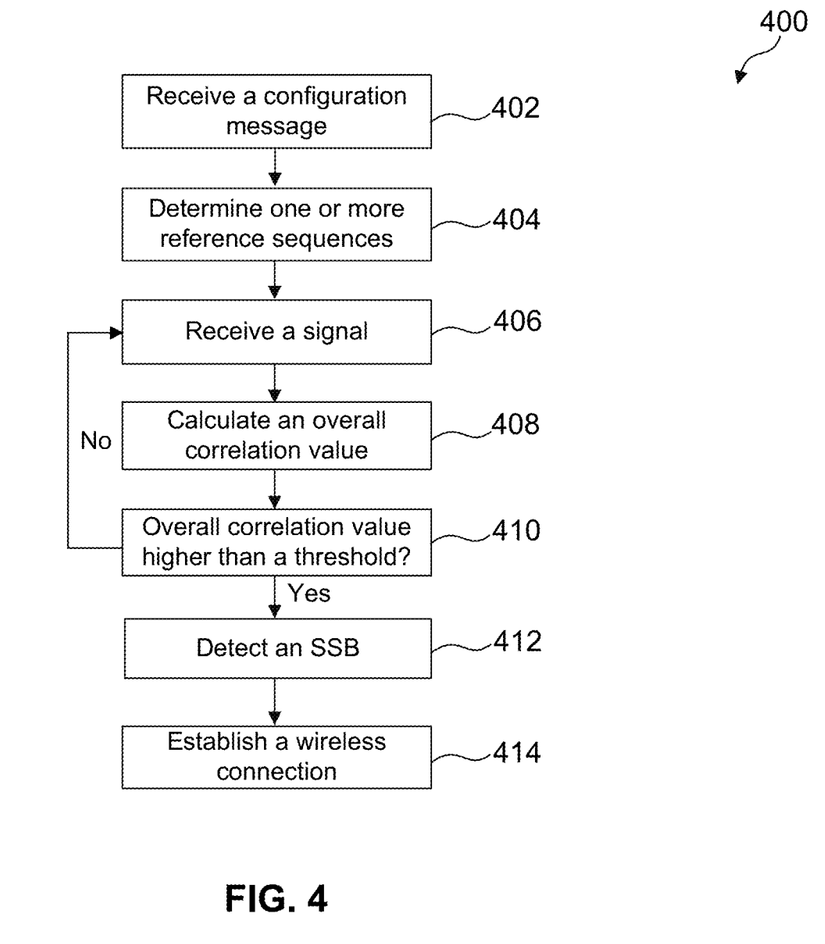
FIG. 4 illustrates an example method for the target cell search, according to aspects of the disclosure.

FIG. 4 illustrates an example method for a target cell search. As a convenience and not a limitation, FIG. 4 may be described with regard to elements of FIGS. 1, 2, and 7. Method 400 may represent the operation of electronic devices (for example, the UE 102 of FIG. 1) implementing the joint detection for the target cell search. The example method 400 may also be performed by system 200 of FIG. 2, controlled or implemented by processor 210, and/or computer system 700 of FIG. 7. But method 400 is not limited to the specific aspects depicted in those figures and other systems may be used to perform the method, as will be understood by those skilled in the art. It is to be appreciated that not all operations may be needed, and the operations may not be performed in the same order as shown in FIG. 4.

At 402, the UE 102 receives a configuration message from the base station 106. In some aspects, the configuration message includes the cell ID of the cell 108, from which the UE 102 can determine the PSS reference sequence and the SSS reference sequence of the cell 108. The configuration may also include the PBCH-DMRS sequence information corresponding to the PBCH-DMRS sequence of the cell 108, such as the SSB index of the cell 108. The configuration message can also include a size and a periodicity of the searching window of the target cell search.

At 404, the UE 102 determines the PSS reference sequence and the SSS reference sequence of the cell 108 based on the configuration message. In addition, the UE 102 can determine the PBCH-DMRS sequence of the cell 108 based on the cell ID of the cell 108 and the PBCH-DMRS sequence information, such as the SSB index, of the cell 108.

At 406, the UE 102 receives a signal from the cell 108 via the base station 110. In some aspects, the UE 102 receives the signal within a search window and stops receiving when the searching window passes. The received signal can include one or more symbols, such as OFDM symbols.

At 408, the UE 102 calculates an overall correlation value. In some aspects, the UE 102 converts the first four symbols into a first, a second, and a third I/Q sample sequences as described above in FIG. 3. For example, the UE 102 treats the first four symbols as the SSB signal symbols 302, 304, 306, and 308 described in FIG. 3. The UE 102 then calculates the overall correlation value between the first, the second, and the third I/Q sample sequences and the PSS reference sequence, the SSS reference sequence, and the PBCH-DMRS sequence of the cell 108. As described above, the UE 102 can combine the first, the second, and the third I/Q sample sequences to provide a first combined sequence and combine the PSS reference sequence, the SSS reference sequence, and the PBCH-DMRS sequence to provide a second combined sequence. Then the UE 102 calculates the overall correlation value between the first and second combined sequences.

In some aspects, the UE 102 can also convert the received signal to an overall I/Q sample sequence. Then the UE 102 determines an overall reference sequence by combining the PSS reference sequence, the SSS reference sequence, and the PBCH-DMRS sequence of the cell 108 as laid out in the symbols 302, 304, 306, and 308. For example, the PBCH-DMRS sequence spans across the symbols 304, 306, and 308. Therefore, the UE 102 divides the PBCH-DMRS sequence into a first, a second, and a third portions corresponding to the symbols 304, 306, and 308 respectively. Then the UE 102 combines the SSS reference sequence and the second portion of the PBCH-DMRS sequence, where the combination corresponds to the symbol 306. The UE 102 concatenates the PSS reference sequence, the first portion of the PBCH-DMRS sequence, a combination of the second portion of the PBCH-DMRS sequence and the SSS reference sequence, and the third portion of the PBCH-DMRS sequence to form the overall reference sequence. After this, the UE 102 calculates the overall correlation value between the overall I/Q sample sequences and the overall reference sequence.

Figure 5:
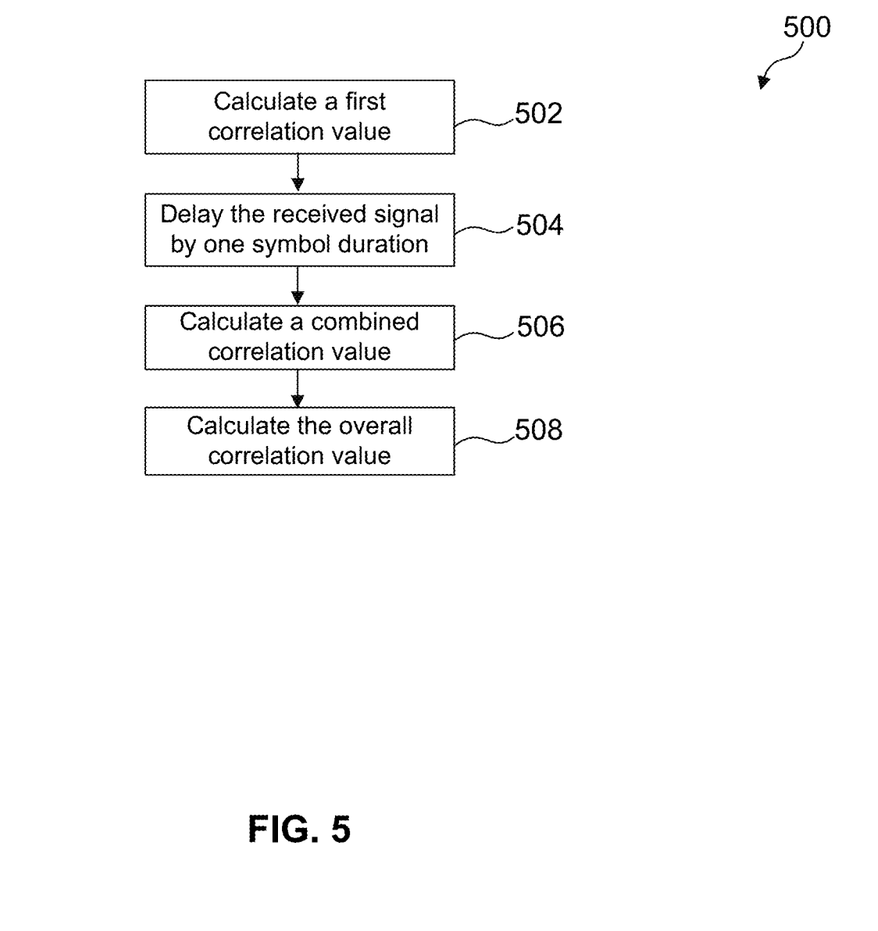
FIG. 5 illustrates an example method for the joint detection, according to aspects of the disclosure.
Figure 6:
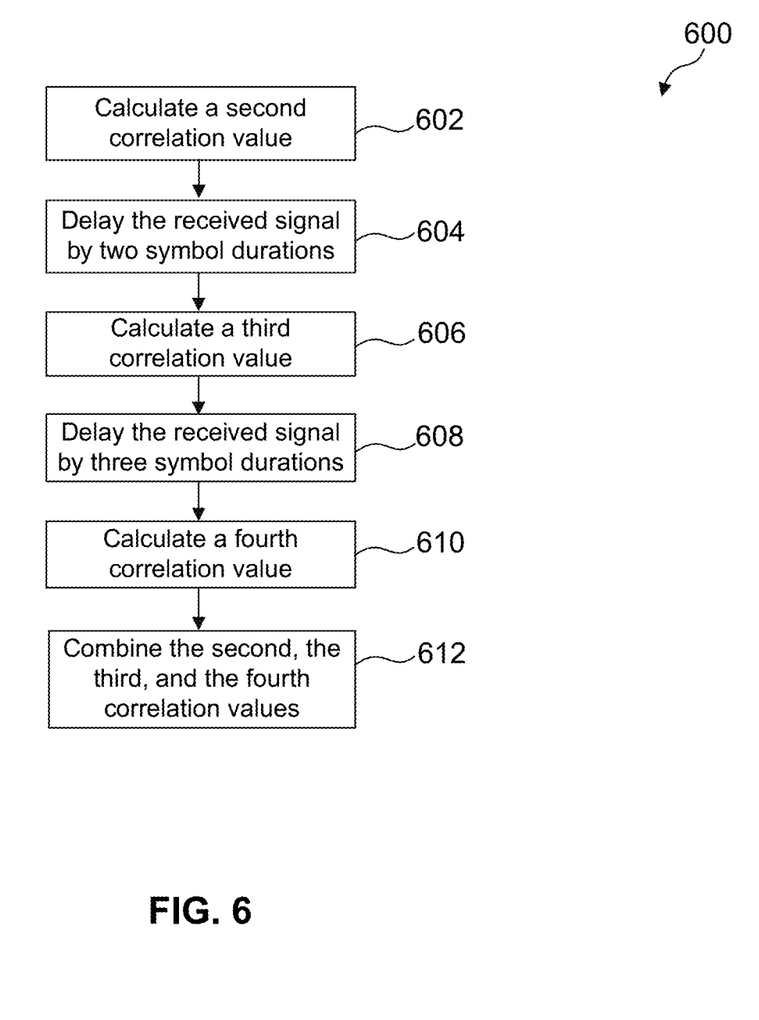
FIG. 6 illustrates an example method for calculating a combined correlation value, according to aspects of the disclosure.

In other aspects, the UE 102 can calculate the overall correlation value by combining a plurality of correlation values as discussed in FIGS. 5 and 6 with more details.

At 410, the UE 102 determines whether the overall correlation value is higher than a threshold. In some aspects, the threshold can be predetermined and/or hard-coded in the UE 102.

If the UE 102 determines that the overall correlation value is lower than the threshold, the control moves back to 406. In some aspects, at 406, if the signal received by the UE 102 previously has more than four symbols, the UE 102 delays the received signal by one I/Q sample duration instead of receiving additional signals. For example, if the received signal has four-symbol duration plus one I/Q sample duration, when the control moves to 406 from 410, the UE 102 delays the received signal by one I/Q sample|. As discussed above, the UE 102 removes a first I/Q sample of the first symbol and concatenate an I/Q sample that follows the first symbol to form a delayed first symbol of the received signals. The second, the third, and the fourth symbol of the received signal are also delay by one I/Q sample similarly.

However, if the signal received by the UE 102 previously has less than or exact four symbols, the UE 102 receives additional signals from the base station 110.

In some aspects, if the additional signals received are in the same searching window as the signal received previously, the UE 102 removes the first I/Q sample of the first symbol of the originally received signal received previously and concatenates it with the additional signals. On the other hand, if the additional signals are received in a different searching window, the UE 102 discards the signal received previously. If the UE 102 determines that the overall correlation value is higher than the threshold, the control moves to 412.

At 412, the UE 102 determines a successful detection of the SSB signal. For example, the UE 102 determines that the first four symbols of the received signal correspond to the symbols 302, 304, 306, and 308 of the SSB signal.

At 414, the UE 102 establishes a wireless connection, such as the connection 114, with the cell 108 via the base station 110. For example, the UE 102 can decode the PBCH payload of the SSB signal and establish the wireless connection using the PBCH payload and other information, such as the PCID.

FIG. 5 illustrates an example method for the joint detection. As a convenience and not a limitation, FIG. 5 may be described with regard to elements of FIGS. 1, 2, and 7. Method 500 may represent the operation of electronic devices (for example, the UE 102 of FIG. 1) implementing the joint detection. The example method 500 may also be performed by system 200 of FIG. 2, controlled or implemented by processor 210, and/or computer system 700 of FIG. 7. But method 500 is not limited to the specific aspects depicted in those figures and other systems may be used to perform the method, as will be understood by those skilled in the art. It is to be appreciated that not all operations may be needed, and the operations may not be performed in the same order as shown in FIG. 5. In some aspects, the method 500 describes details of 408 in FIG. 4.

At 502, the UE 102 calculates a first correlation value. In some aspects, the UE 102 converts the first symbol of the received signal to the first I/Q sample sequence as described above. The UE 102 then calculates the first correlation value between the first I/Q sample sequence and the PSS reference sequence. In other aspects, the UE 102 converts the received signal to an overall I/Q sample sequence and calculates the first correlation value between the overall I/Q sample sequence and the PSS reference sequence. In such a case, a length of the overall I/Q sample sequence may be different from a length of the PSS reference sequence.

At 504, the UE 102 delays the received signal by one symbol duration. For example, similar to a shift register, the UE 102 processes the second symbol and symbols following the second symbol. In some aspects, the UE 102 converts the second, the third, and the fourth symbols to a combined I/Q sample sequence, which corresponds to the SSS reference sequence and the PBCH-DMRS sequence of the cell 108. In other aspects, the UE 102 converts the second, the third, and the fourth symbols to a plurality of I/Q sample sequences as described in FIG. 6 with more details.

At 506, the UE 102 calculates a combined correlation value. In some aspects, the UE 102 determines a combined reference sequence based on the SSS reference sequence and the PBCH-DMRS sequence of the cell 108. The UE 102 then calculates a combined correlation value between the combined I/Q sample sequence in 504 and the combined reference sequence. In other aspects, the UE 102 calculates the combined correlation value based on a plurality of correlation values that are calculated based on the plurality of I/Q sample sequences as described in FIG. 6 with more details.

At 508, the UE 102 calculates the overall correlation value by combining the first correlation value and the combined correlation value. In some aspects, the UE 102 combines the first correlation value and the combined correlation value non-coherently by adding absolute values of the first and the combined correlation values. In other aspects, the UE 102 combines the first correlation value and the combined correlation value coherently by adding the first and the combined correlation values directly, wherein the first and the combined correlation values can be complex or real numbers.

FIG. 6 illustrates an example method for calculating the combined correlation value. As a convenience and not a limitation, FIG. 6 may be described with regard to elements of FIGS. 1, 2, and 7. Method 600 may represent the operation of electronic devices (for example, the UE 102 of FIG. 1) implementing calculating the combined correlation value. The example method 600 may also be performed by system 200 of FIG. 2, controlled or implemented by processor 210, and/or computer system 700 of FIG. 7. But method 600 is not limited to the specific aspects depicted in those figures and other systems may be used to perform the method, as will be understood by those skilled in the art. It is to be appreciated that not all operations may be needed, and the operations may not be performed in the same order as shown in FIG. 6.

At 602, the UE 102 calculates a second correlation value. For example, the UE 102 converts the second symbol of the received signal to a second I/Q sample sequence. The UE 102 then determines a first portion of the PBCH-DMRS sequence, which corresponds to a portion of the PBCH-DMRS sequence included in the second symbol of the SSB signal, such as the symbol 304. This is because the PBCH-DMRS sequence spans across the second, the third, and the fourth symbol as shown in FIG. 3. In other words, the UE 102 treats the second symbol of the received signal as the second symbol of the SSB signal, such as the symbol 304, and extracts the portion of the PBCH-DMRS sequence included in the second symbol. The UE 102 then calculates the second correlation value between the second I/Q sample sequence and the first portion of the PBCH-DMRS sequence.

In some aspects, the UE 102 calculates the second correlation value based on the overall I/Q sample sequence described in 502. The UE 102 delays the received signal by one symbol duration by truncating the overall I/Q sample sequence. For example, the UE 102 removes a portion of the overall I/Q sample sequence that corresponds to the first symbol of the received signal. Then the UE 102 calculates the second correlation value between the overall I/Q sample sequence with one symbol duration delay and the first portion of the PBCH-DMRS.

At 604, the UE 102 delays the received signal by two symbol durations. In some aspects, the UE 102 converts the third symbol of the received signal to a third I/Q sample sequence. In other aspects, the UE 102 delays the received signal by two symbol durations by truncating the overall I/Q sample sequence. For example, the UE 102 removes a portion of the overall I/Q sample sequence that corresponds to the first and the second symbols of the received signal.

At 606, the UE 102 calculates a third correlation value. The UE 102 determines a combined reference sequence based on the second portion of the PBCH-DMRS sequence and the SSS reference sequence. The UE 102 then calculates the third correlation value between the third I/Q sample sequence and the combined reference sequence. In other aspects, the UE 102 calculates the third correction value based on the overall I/Q sample sequence. For example, the UE 102 calculates the third correlation value between the overall I/Q sample sequence with two symbol duration delay and the combined reference sequence.

At 608, the UE 102 delays the received signal by three symbol durations. In some aspects, the UE 102 converts the fourth symbol of the received signal to a fourth I/Q sample sequence. In other aspects, the UE 102 delays the received signal by three symbol durations by truncating the overall I/Q sample sequence. For example, the UE 102 removes a portion of the overall I/Q sample sequence that corresponds to the first, the second, and the third symbols of the received signal.

At 610, the UE 102 calculates a fourth correlation value. In some aspects, the UE 102 calculates the fourth correlation value between the fourth I/Q sample sequence and the third portion of the PBCH-DMRS sequence. In other aspects, the UE 102 calculates the fourth correction value based on the overall I/Q sample sequence. For example, the UE 102 calculates the fourth correlation value between the overall I/Q sample sequence with three symbol duration delay and the third portion of the PBCH-DMRS sequence.

In some aspects, the steps 602-610 describe details of 504 in FIG. 5.

At 612, the UE 102 combines the second, the third, and the fourth correlation values. In some aspects, the UE 102 combines the second, the third, and the fourth correlation values non-coherently by adding absolute values of the second, the third, and the fourth correlation values. In other aspects, the UE 102 combines the second, the third, and the fourth correlation values coherently by adding the second, the third, and the fourth correlation values directly, wherein the second, the third, and the fourth correlation values can be complex or real numbers. In some aspects, step 612 describes details of 506 in FIG. 5.

Figure 7:
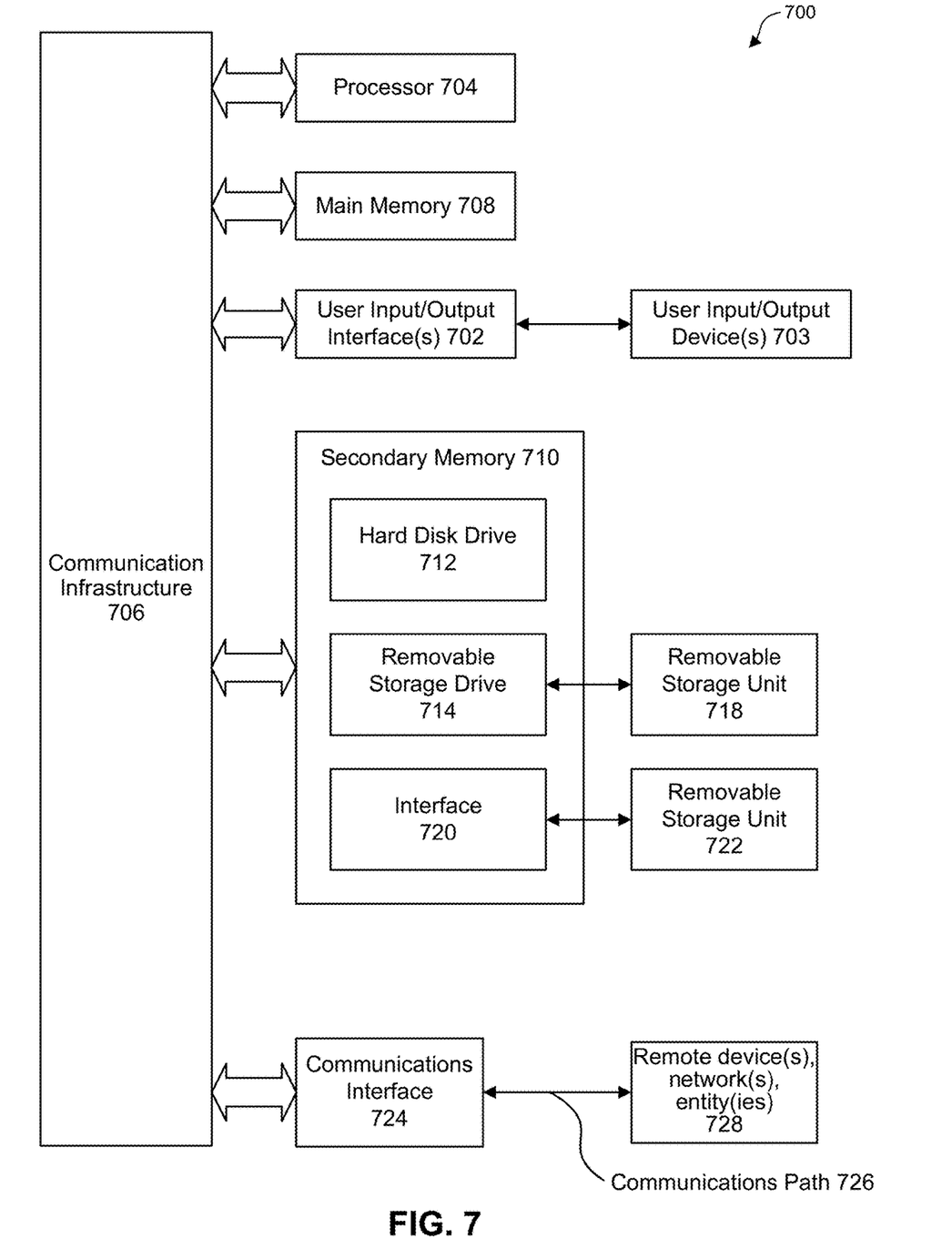
FIG. 7 is an example computer system for implementing some aspects of the disclosure or portion(s) thereof.

Various aspects may be implemented, for example, using one or more computer systems, such as computer system 700 shown in FIG. 7. Computer system 700 may be any well-known computer capable of performing the functions described herein such as electronic devices 102, 106, and 110 of FIG. 1, or 200 of FIG. 2. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/ any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
a transceiver; and
a processor, communicatively coupled to the transceiver, and configured to:
    determine a reference signal sequence that comprises a first level synchronization sequence and a second level synchronization sequence of a target cell;
    receive, using the transceiver, a signal sequence from the target cell;
    calculate a first correlation value based on the first level synchronization sequence and the received signal sequence;
    delay the received signal sequence by a predetermined number of symbol durations;
    calculate a second correlation value based on the second level synchronization sequence and the delayed received signal sequence;
    calculate an overall correlation value based on the reference signal sequence and the received signal sequence by combining the first correlation value and the second correlation value non-coherently;
    determine whether the overall correlation value exceeds a threshold;
    based on the overall correlation value exceeding the threshold, detect a synchronization signal of the target cell based on the received signal sequence; and
    establish, using the transceiver, a wireless connection with the target cell based on the synchronization signal.

2. The UE of claim 1, wherein the first level synchronization sequence includes a primary synchronization signal (PSS) sequence, and wherein the second level synchronization sequence includes a secondary synchronization signal (SSS) sequence.

3. The UE of claim 2, wherein the reference signal sequence further comprises a first physical broadcast channel demodulation reference signal (PBCH DMRS), a second PBCH DMRS, and a third PBCH DMRS of the target cell.

4. The UE of claim 1, wherein the reference signal sequence further comprises a cell-specific reference sequence (CRS).

5. The UE of claim 3, wherein, to calculate the overall correlation value, the processor is further configured to:
    calculate a first correlation value based on the PSS sequence and the received signal sequence;
    delay the received signal sequence by one symbol duration;
    calculate a combined correlation value based on the delayed received signal sequence, the SSS sequence, and the first, the second, the third PBCH DMRSs; and
    calculate the overall correlation value by non-coherently combining the first correlation value and the combined correlation value.

6. The UE of claim 5, wherein, to calculate the combined correlation value, the processor is further configured to:
    determine a first delayed signal sequence by delaying the received signal sequence by one symbol duration;
    calculate a second correlation value based on the first PBCH DMRS and the first delayed signal sequence;
    determine a second delayed signal sequence by delaying the received signal sequence by two symbol durations;

calculate a third correlation value based on the second delayed signal sequence and a combination of the SSS sequence and the second PBCH DMRS;

determine a third delayed signal sequence by delaying the received signal sequence by three symbol durations;

calculate a fourth correlation value based on the third delayed signal sequence and the third PBCH DMRS; and calculate the combined correlation value by coherently combining the second, the third, and the fourth correlation values.

7. The UE of claim 1, wherein the processor is further configured to determine the reference signal sequence by receiving a configuration message from a serving cell.

8. The UE of claim 3, wherein, to determine the first, the second, and the third PBCH DMRSs, the processor is further configured to:

receive an SSB index of a serving cell and a cell ID of the target cell from the serving cell;

determine an SSB index of the target cell based on the SSB index of the serving cell; and determine the first, the second, and the third PBCH DMRSs based on the SSB index and the cell ID of the target cell.

9. A method of a user equipment (UE) connecting to a target cell, the method comprising:

determining a reference signal sequence that comprises a first level synchronization sequence and a second level synchronization sequence of the target cell;

receiving a signal sequence from the target cell;

calculating a first correlation value based on the first level synchronization sequence and the received signal sequence;

delaying the received signal sequence by a predetermined number of symbol durations;

calculating a second correlation value based on the second level synchronization sequence and the delayed received signal sequence;

calculating an overall correlation value based on the reference signal sequence and the received signal sequence by combining the first correlation value and the second correlation value non-coherently;

determining whether the overall correlation value exceeds a threshold;

based on the overall correlation value exceeding the threshold, detecting a synchronization signal of the target cell based on the received signal sequence; and establishing a connection with the target cell based on the synchronization signal.

10. The method of claim 9, wherein the first level synchronization sequence includes a primary synchronization signal (PSS) sequence, and wherein the second level synchronization sequence includes a secondary synchronization signal (SSS) sequence.

11. The method of claim 9, wherein the reference signal sequence further comprises a cell-specific reference sequence (CRS).

12. The method of claim 10, wherein the reference signal sequence further comprises a first physical broadcast channel demodulation reference signal (PBCH DMRS), a second PBCH DMRS, and a third PBCH DMRS of the target cell.

13. The method of claim 12, wherein the calculating the overall correlation value further comprises:

calculating a first correlation value based on the PSS sequence and the received signal sequence;

delaying the received signal sequence by one symbol duration;

calculating a combined correlation value based on the delayed received signal sequence, the SSS sequence, and the first, the second, and the third PBCH DMRSs; and calculating the overall correlation value by non-coherently combining the first correlation value and the combined correlation value.

14. The method of claim 13, wherein the calculating the combined correlation value further comprises:

determining a first delayed signal sequence by delaying the received signal sequence by one symbol duration;

calculating a second correlation value based on the first PBCH DMRS and the first delayed signal sequence;

determining a second delayed signal sequence by delaying the received signal sequence by two symbol durations;

calculating a third correlation value based on the second delayed signal sequence and a combination of the SSS sequence and the second PBCH DMRS;

determining a third delayed signal sequence by delaying the received signal sequence by three symbol durations;

calculating a fourth correlation value based on the third delayed signal sequence and the third PBCH DMRS; and calculating the combined correlation value by coherently combining the second, the third, and the fourth correlation values.

15. The method of claim 9, further comprising determining the reference signal sequence by receiving a configuration message from a serving cell.

16. The method of claim 12, wherein the determining the first, the second, and the third PBCH DMRSs further comprises:

receiving an SSB index of a serving cell and a cell ID of the target cell from the serving cell;

determining an SSB index of the target cell based on the SSB index of the serving cell; and determining the first, the second, and the third PBCH DMRSs based on the SSB index and the cell ID of the target cell.

17. A non-transitory computer-readable medium (CRM) comprising instructions to, upon execution of the instructions by one or more processors of a user equipment (UE), cause the UE to perform operations, the operations comprising:

determining a reference signal sequence that comprises a first level synchronization sequence and a second level synchronization sequence of a target cell;

receiving a signal sequence from the target cell;

calculating a first correlation value based on the first level synchronization sequence and the received signal sequence;

delaying the received signal sequence by a predetermined number of symbol durations;

calculating a second correlation value based on the second level synchronization sequence and the delayed received signal sequence;

calculating an overall correlation value based on the reference signal sequence and the received signal sequence by combining the first correlation value and the second correlation value non-coherently;

determining whether the overall correlation value exceeds a threshold;

based on the overall correlation value exceeding the threshold, detecting a synchronization signal of the target cell based on the received signal sequence; and establishing a connection with the target cell based on the synchronization signal.

18. The non-transitory CRM of claim 17, wherein the reference signal sequence further comprises a first physical broadcast channel demodulation reference signal (PBCH DMRS), a second PBCH DMRS, and a third PBCH DMRS of the target cell.

19. The non-transitory CRM of claim 17, wherein the first level synchronization sequence includes a primary synchronization signal (PSS) sequence, and wherein the second level synchronization sequence includes a secondary synchronization signal (SSS) sequence.

20. The non-transitory CRM of claim 18, wherein, to determine the reference signal sequence, the processor is further configured to:
   receive an SSB index of a serving cell and a cell ID of the target cell from the serving cell;
   determine an SSB index of the target cell based on the SSB index of the serving cell; and
   determine the first, the second, and the third PBCH DMRSs based on the SSB index and the cell ID of the target cell.

\* \* \* \* \*